United States Patent
Kumar et al.

(10) Patent No.: US 7,909,574 B2
(45) Date of Patent: Mar. 22, 2011

(54) SYSTEM AND METHOD FOR WIND FRICTION MONITORING

(75) Inventors: Vivek Kumar, Samastipur (IN); Chery Jose, Cochin (IN); Hemanth Kumar Anjanappa, Bangalore (IN); Sandeep Kumar Vidiyala, Warangal (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/607,276

(22) Filed: Oct. 28, 2009

(65) Prior Publication Data

US 2010/0143120 A1    Jun. 10, 2010

(51) Int. Cl.
*F03D 11/00*    (2006.01)
(52) U.S. Cl. .................... 416/1; 416/39; 416/41; 416/61
(58) Field of Classification Search ............... 416/1, 39, 416/40, 41, 61; 415/1, 2.2, 4.1, 4.3, 4.5, 415/26, 47, 48, 118
See application file for complete search history.

(56) References Cited

U.S. PATENT DOCUMENTS

| | | | |
|---|---|---|---|
| 6,619,918 B1 * | 9/2003 | Rebsdorf | 416/1 |
| 6,890,152 B1 * | 5/2005 | Thisted | 416/1 |
| 6,966,754 B2 * | 11/2005 | Wobben | 416/61 |
| 7,322,794 B2 * | 1/2008 | LeMieux et al. | 416/40 |
| 7,347,668 B2 * | 3/2008 | Pedersen | 416/1 |
| 7,708,524 B2 * | 5/2010 | Sundermann et al. | 416/39 |
| 2008/0120080 A1 * | 5/2008 | Nasle | 703/13 |
| 2008/0141768 A1 | 6/2008 | Ormel et al. | |

* cited by examiner

*Primary Examiner* — Igor Kershteyn
(74) *Attorney, Agent, or Firm* — Cantor Colburn LLP

(57) ABSTRACT

A monitoring system for at least one wind turbine includes at least one sensor disposed at the at least one wind turbine to detect wind friction at the at least one wind turbine. At least one controller is connected to the at least one wind turbine, and a monitor server is connected to the controller to change an operational status of the at least one wind turbine based on wind friction data received from the at least one sensor. A method of operation of at least one wind turbine includes continuously measuring data relative to wind friction at the at least one wind turbine via at least one sensor located thereat. The data is continuously compared to a predetermined wind friction threshold. A trend in the comparisons is evaluated, and the operational status of the wind turbine is changed via a monitor server based on a result of the comparison.

16 Claims, 4 Drawing Sheets

SYSTEM AND METHOD FOR WIND FRICTION MONITORING

BACKGROUND OF THE INVENTION

The subject matter disclosed herein relates to wind farms. More particularly, this disclosure relates to monitoring of friction in wind turbines of wind farms.

The use of wind turbines for power generation is increasing in popularity. As such, more wind turbines, and groups of wind turbines called "wind farms" are being erected at locations subject to adverse weather conditions, for example, off-shore locations or alpine areas. In locations such as these, the wind turbines have an increased likelihood of accumulation of ice and/or snow resulting in increased mass loads and frictional loads on the wind turbines. Further, in some instances, once a wind turbine accumulates ice and/or snow to a certain degree, operation of the wind turbine must be stopped to prevent, for example, an ice or snow throw by the wind turbine. The wind turbine must be stopped until the ice or snow accumulation is reduced. Typically, monitoring of ice accumulation on such wind turbines is accomplished via inspection of individual wind turbines by, for example, a technician or field engineer. In large wind farms containing perhaps hundreds of wind turbines spread over large geographical areas, traditional monitoring of the conditions of individual turbines can be extremely time consuming and costly.

BRIEF DESCRIPTION OF THE INVENTION

According to one aspect of the invention, a monitoring system for at least one wind turbine includes at least one sensor disposed at the at least one wind turbine to detect wind friction at the at least one wind turbine. At least one controller is connected to the at least one wind turbine, and a monitor server is connected to the at least one controller to change an operational status of the at least one wind turbine based on wind friction data received from the at least one sensor.

According to another aspect of the invention, a method of operation of at least one wind turbine includes continuously measuring data relative to wind friction at the at least one wind turbine via at least one sensor located thereat. The data is continuously compared to a predetermined wind friction threshold. A trend in the comparisons is evaluated to determine if a change in the operational status of the at least one wind turbine is necessary, and the operation of the wind turbine is changed based on the evaluation of the comparisons.

According to yet another aspect of the invention, a monitoring system for a wind farm having a plurality of wind turbines includes at least one sensor located each wind turbine of the wind farm to detect wind friction at each wind turbine of the wind farm. At least one controller is connected with each wind turbine of the wind farm, and a monitor server is connected to the at least one controller to change an operational status of each wind turbine of the wind farm based on wind friction data received from the at least one sensor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
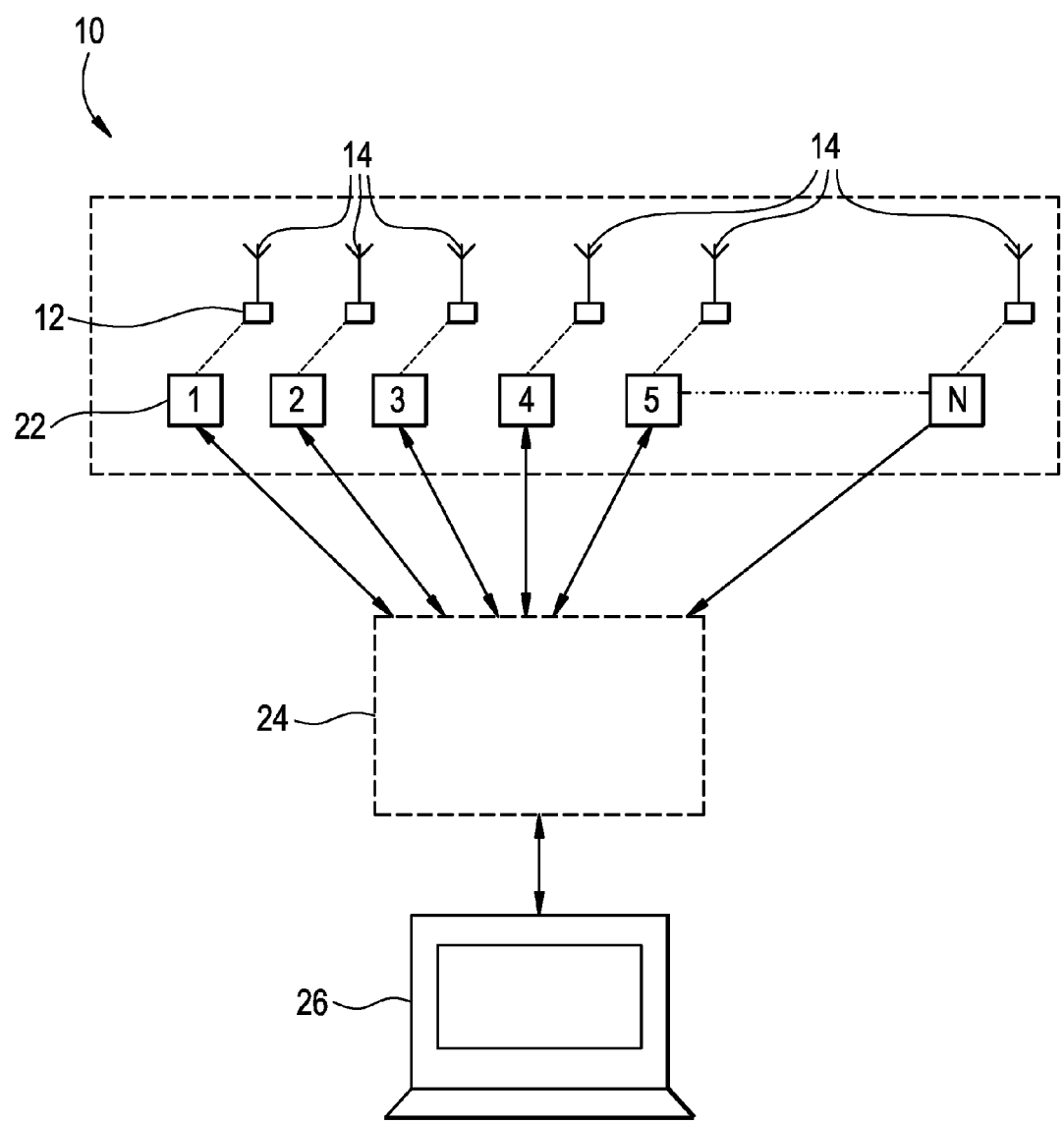
FIG. 1 is a schematic illustration of an embodiment of a wind turbine monitoring system.
Figure 2:
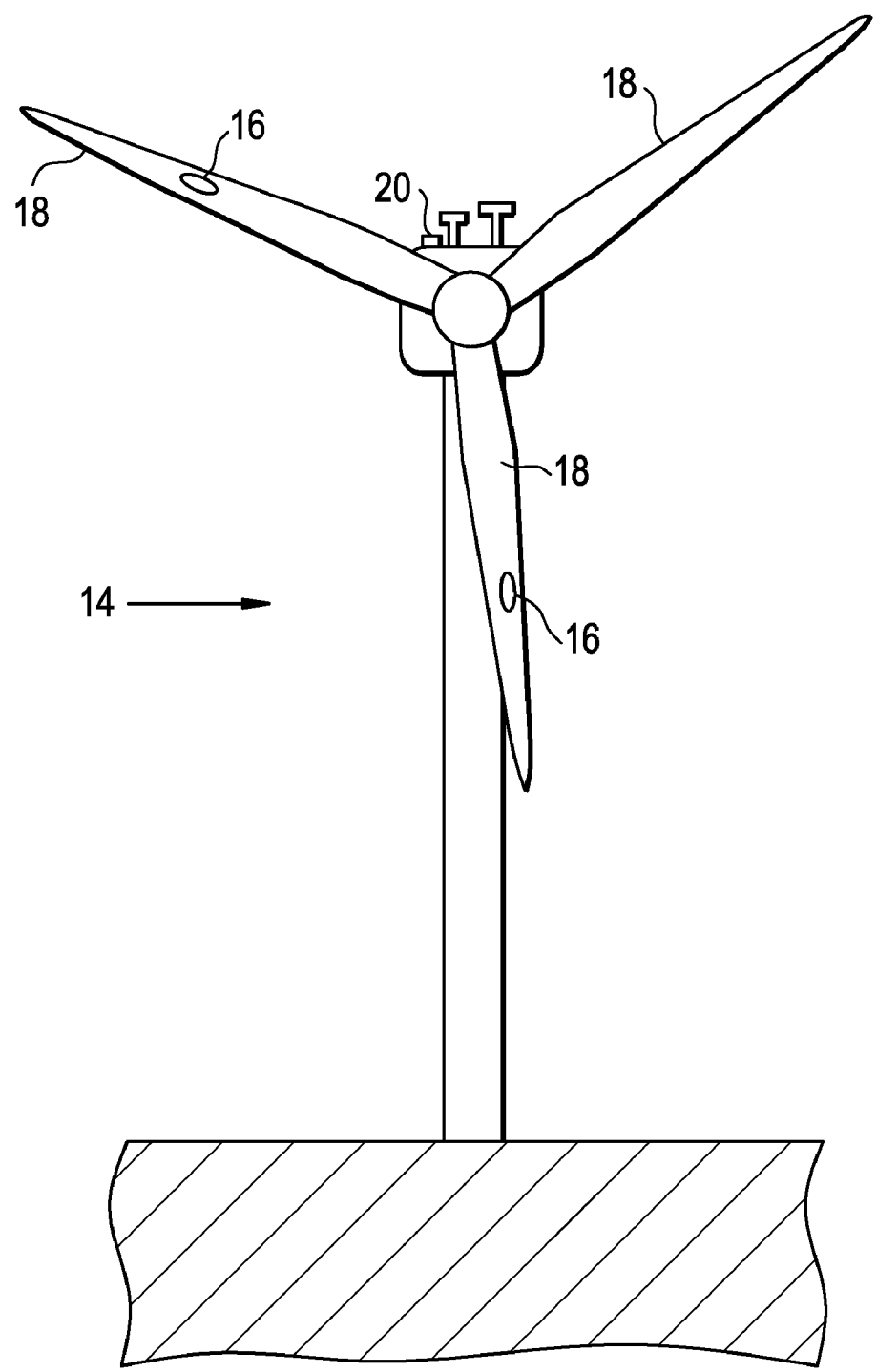
FIG. 2 illustrates a wind turbine.

Shown in FIG. 1 is a schematic illustration of an embodiment of a wind turbine or wind farm monitoring system 10. The monitoring system 10 includes one or more sensors 12 operably connected to at least one wind turbine 14 of a plurality of wind turbines 14. The sensors 12 are disposed and configured to quantitatively determine an amount of wind friction in the wind turbine 14 caused by, for example, accumulation of snow and/or ice on the wind turbine 14 to which the one or more sensors 12 are connected. In some embodiments, the one or more sensors 12 may be configured to determine if icing conditions exist by measuring, for example, a temperature of the wind turbine 14. Further, referring now to FIG. 2, the one or more sensors 12 may include one or more ice sensors 16 disposed at, for example, one or more blades 18 of the wind turbine 14 and/or may include one or more anemometers 20 configured to determine an amount of wind friction in the wind turbine 14 as, for example, in U.S. Patent Application Pub. 2008/0141768, also owned by the present assignee, which is incorporated herein by reference.

Referring again to FIG. 1, the plurality of wind turbines 14 are connected to a plurality of controllers 22, for example, a plurality of programmable logic controllers (PLCs). In some embodiments, each controller 22 of the plurality of controllers 22 is connected to a unique wind turbine 14 of the plurality of wind turbines 14. Further, the controller 22 may be connected to the wind turbine 14 via the one or more sensors 12.

The plurality of controllers 22 are operably connected to at least one monitoring server 24, which in some embodiments comprises a computer. As shown in FIG. 1, in some embodiments, the plurality of controllers 22 are connected to a single monitoring server 24. The plurality of controllers 22 collect data from the one or more sensors 12, which in turn is collected from the plurality of controllers 22 by the at least one monitoring server 24. The at least one monitoring server 24 utilizes the data collected by the one or more sensors 12 to determine an of friction in the plurality of wind turbines' 14 operation caused by, for example, an amount of ice and/or snow accumulated on the plurality of wind turbines 14. The friction at each wind turbine 14 of the plurality of wind turbines 14 is compared to a friction threshold. In some embodiments, the at least one monitoring server 24 is capable of determining the friction threshold at points during the operation of the plurality of wind turbines 14 based on, for example, weather conditions, including ambient temperature and/or wind velocity. Further, the threshold may be substantially the same for each wind turbine 14 of the plurality of wind turbines 14 in a particular wind farm or may be determined independently for each wind turbine 14, utilizing information such as elevation of each wind turbine 14 and/or historical data from each wind turbine 14. Based on the results of the comparison, the at least one monitoring server 24 may instruct the plurality of controllers 22 to take action regarding the operation of the plurality of wind turbines 14. For example, if precipitation, such as ice or snow, accumulation (hereinafter referred to as "ice" and/or "snow") at a particular wind turbine 14 results in friction which exceeds the friction threshold, the at least one monitoring server 24 may direct the controller 22 connected to the wind turbine 14 to stop the operation of the wind turbine 14 until the accumulation recedes to a level at which the friction is below the friction threshold. In some embodiments, the wind turbines 14 are substantially continually monitored. The monitoring server 24 may require that a number of friction readings, for example, three or five friction readings, exceeding the friction threshold before directing the controller 22 to stop the operation of the wind turbine 14. At some point when the friction recedes below the friction threshold, the monitoring server 24 may direct the controller 22 to restart the wind turbine 14. As with stopping the operation of the wind turbine 14, in some embodiments, the monitoring server 24 may require a number or friction readings, for example, three or five friction readings, which are below the friction threshold before directing the controller 22 to restart operation of the wind turbine 14.

Figure 3:
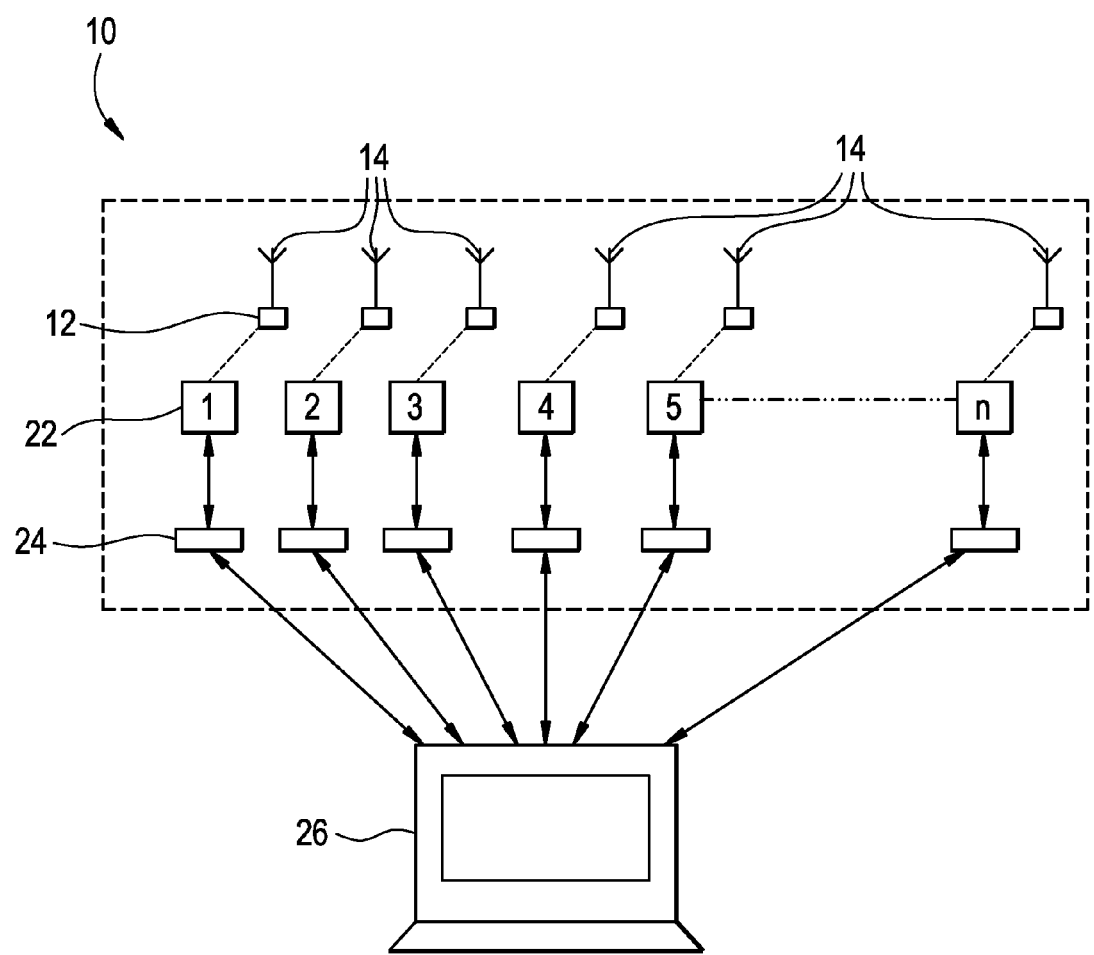
FIG. 3 is a schematic illustration of another embodiment of a wind turbine monitoring system.

Referring now to FIG. 3, in other embodiments, multiple monitoring servers 24 are utilized. Each wind turbine 14 and may be connected through its corresponding controller 22 to a separate monitoring server 24. In such embodiments, each monitoring server 24 utilizes data collected by the one or more sensors 12 to determine the amount of friction at its associated wind turbine 14 and instructs the controller 22 of the wind turbine 14 to take action based on results of a comparison between the amount of friction and the friction threshold. Use of the at least one monitoring server 24 allows for real-time monitoring of large quantities of wind turbines 14 located over a wide geographical area and allows, via the plurality of controllers 22, for real-time control of the operational conditions of each wind turbine 14 of the plurality of wind turbines 14 thereby preventing damage to the wind turbines 14.

Figure 4:
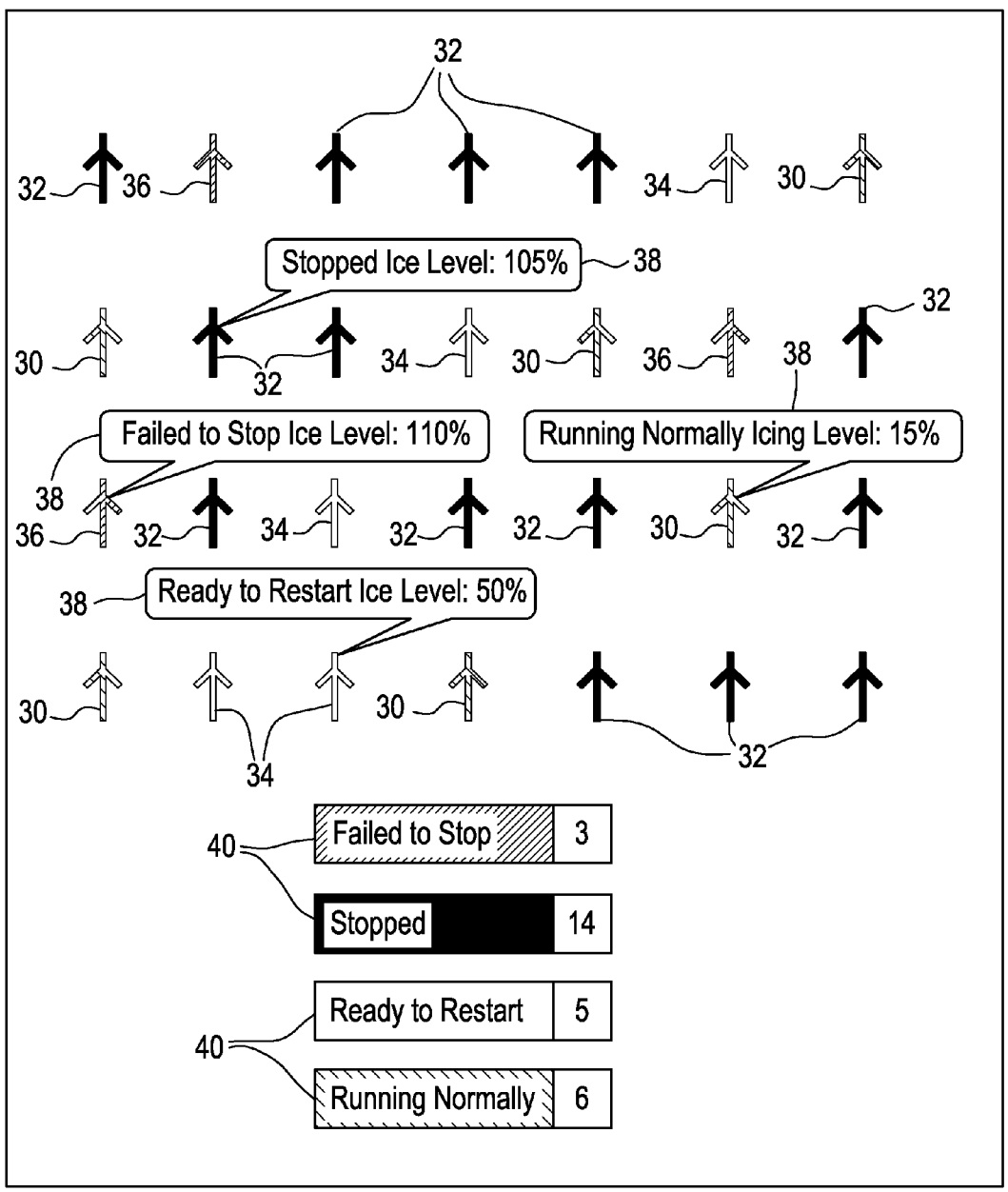
FIG. 4 is a view of an embodiment of a graphical user interface for a wind turbine monitoring system.

In some embodiments, as shown in FIGS. 1 and 3, the wind farm monitoring system 10 includes a graphical user interface 26 operably connected to the at least one monitoring server 24. The graphical user interface 26 may be, for example a CRT. The graphical user interface 26 utilizes data received from the at least one monitoring server 24 and is configured to display information regarding the operational status of the plurality of wind turbines 14. As shown in FIG. 4, the graphical user interface 26 includes graphic or textual representations of friction conditions due to, for example, ice and/or snow accumulation, present at each wind turbine 14 of the plurality of wind turbines 14. Further, the graphic or textual representations may include the operational status of each wind turbine 14 of the plurality of wind turbines 14. The graphical user interface 26 may include a graphical representation or icon which represents each wind turbine 14 of the plurality of wind turbines 14 present in, for example, a wind farm. Each displayed icon on the graphical user interface 26 may be presented in a color that represents the operational status of the icon's corresponding wind turbine 14.

For example, a green icon 30 may signify a normally functioning wind turbine 14, a gray icon 32 may signify a wind turbine 14 which has been stopped, a yellow icon 34 may indicate a wind turbine 14 which is stopped due to friction exceeding the threshold, but is ready to be restarted, and a red icon 36 may indicate a wind turbine 14 at which friction due to ice or snow accumulation presently exceeds the threshold. As stated above, a normally functioning wind turbine 14 is represented by a green icon 30. As ice and/or snow accumulates on the wind turbine 14 causing friction in the wind turbine 14 which exceeds the friction threshold, the icon for that particular wind turbine 14 changes color from a green icon 30 to a red icon 36 indicating that friction currently exceeds the friction threshold, but the wind turbine 14 has not been stopped. If, during subsequent measurements, the friction continues to exceed the friction threshold, the controller 22 may stop operation of the wind turbine 14, at which time the icon becomes a gray icon 32 to indicate that the wind turbine 14 is not currently operational. The ice and/or snow accumulation causing the increased friction in the wind turbine may be removed by, for example, being naturally melted or by a removal system. At this time, measurements may indicate that the friction has been reduced to lower than the friction threshold. As the number of required measurements are taken, and are below the friction threshold, the icon changes to a yellow icon 34 indicating that the wind turbine 14 is preparing to restart. When the wind turbine 14 is restarted, either manually by an operator or automatically by the controller 22, the icon again returns to a green icon 30. It is to be appreciated that the colors described herein are merely exemplary and other colors and/or schemes may be utilized at the graphical user interface 26.

In some embodiments, the graphical user interface 26 may include textual notes 38 displayed in addition to or instead of the colored icons. For example, the textual notes 38 may include an indication of the ice and/or snow accumulation level at each wind turbine 14, or an indication of a quantitative amount of friction present in each wind turbine 14. Other textual notes 38 may be included, such as textual notes 38 which indicate the operational status of each wind turbine 14, or which indicate a total operational capacity of the wind farm as a whole at any given time For example, summary boxes 40 are shown in FIG. 4 which indicate a number of wind turbines 14 having each operational status described above. The summary boxes may be color-coded to correspond with the colors of the individual wind turbine 14 icons. The graphical user interface 26 including color-changing icons corresponding to each wind turbine 14 of the plurality of wind turbines 14 allows a user to have real time understanding of the ice accumulation and operational status of each wind turbine 14 of the plurality of wind turbines 14, to assess, for example, down time of the wind turbines 14, potential safety issues, and a power generation and/or revenue production status of the individual wind turbines 14 and/or the wind farm as a whole.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A monitoring system for at least one wind turbine comprising:
   at least one sensor disposed at the at least one wind turbine to detect wind friction at the at least one wind turbine;
   at least one controller in operable communication with the at least one wind turbine; and, a monitor server operably connected to the at least one controller to start and/or stop operation of the at least one wind turbine based on wind friction data received from the at least one sensor.

2. The monitoring system of claim 1, further comprising a graphical user interface which displays the operational status, resulting from the wind friction data, of each wind turbine of the at least one wind turbine to a user.

3. The monitoring system of claim 2 wherein the graphical user interface is configured to display a representation of the operational status of each wind turbine of the at least one wind turbine.

4. The monitoring system of claim 3 wherein the representation is color coded to reflect the operational status of each wind turbine of the at least one wind turbine.

5. The monitoring system of claim 2 wherein the graphical user interface displays textual notes relating to the operational status, resulting from wind friction data, of each wind turbine of the plurality of wind turbines.

6. The monitoring system of claim 1 wherein the at least one sensor detects accumulation of ice and/or snow on the at least one wind turbine.

7. The monitoring system of claim 1 wherein each wind turbine of the at least one wind turbine is connected to a unique monitor server.

8. A method of operation of at least one wind turbine comprising:
   continuously measuring data relative to wind friction at the at least one wind turbine via at least one sensor disposed thereat;
   continuously comparing the data to a predetermined wind friction threshold;
   evaluating a trend in the comparisons to determine if a change in the operational status of the at least one wind turbine is necessary; and,
   changing the operational status of the wind turbine via a monitor server based on the evaluation of the comparisons.

9. The method of claim 8, further comprising displaying an operational status of each wind turbine of the at least one wind turbine to a user.

10. The method of claim 9, further comprising displaying a representation of each wind turbine of the operational status of the at least one wind turbine via the graphical user interface.

11. The method of claim 10 wherein the representation is color coded to reflect the operational status of each wind turbine of the plurality of wind turbines.

12. The method of claim 10 wherein the graphical user interface displays textual notes relating to the operational status of each wind turbine of the plurality of wind turbines.

13. The method of claim 8, further comprising detecting accumulation of ice and/or snow on the at least one wind turbine via the at least one sensor.

14. The method of claim 8, further comprising instructing the at least one controller via the monitor server to stop operation of each wind turbine of the at least one wind turbine when an amount of wind friction at each wind turbine of the at least one wind turbine exceeds the wind friction threshold.

15. The method of claim 8, further comprising instructing the at least one controller via the monitor server to restart operation of each wind turbine of the at least one wind turbine when an amount of wind friction at each wind turbine of the at least one wind turbine drops below the wind friction threshold.

16. A monitoring system for a wind farm having a plurality of wind turbines comprising:
   at least one sensor disposed at each wind turbine of the wind farm to detect wind friction at each wind turbine of the wind farm;
   at least one controller in operable communication with each wind turbine of the wind farm; and,
   a monitor server operably connected to the at least one controller to start and/or stop operation of each wind turbine of the wind farm based on wind friction data received from the at least one sensor.

* * * * *